US011093959B2

(12) United States Patent
Heaton et al.

(10) Patent No.: US 11,093,959 B2
(45) Date of Patent: Aug. 17, 2021

(54) SYSTEMS AND METHODS FOR IMPROVING THE LIQUIDITY AND DISTRIBUTION NETWORK FOR LUXURY AND OTHER ILLIQUID ITEMS

(71) Applicant: BGC PARTNERS, INC., New York, NY (US)

(72) Inventors: Timothy H. Heaton, Morristown, NJ (US); Howard W. Lutnick, New York, NY (US)

(73) Assignee: BGC PARTNERS, INC., New York, NY (US)

( * ) Notice: Subject to any disclaimer, the term of this patent is extended or adjusted under 35 U.S.C. 154(b) by 322 days.

(21) Appl. No.: 16/027,940

(22) Filed: Jul. 5, 2018

(65) Prior Publication Data

US 2018/0315064 A1    Nov. 1, 2018

Related U.S. Application Data

(63) Continuation of application No. 13/613,662, filed on Sep. 13, 2012, now abandoned, which is a
(Continued)

(51) Int. Cl.
*G06Q 30/02* (2012.01)
*G06Q 30/06* (2012.01)
(Continued)

(52) U.S. Cl.
CPC ..... *G06Q 30/0205* (2013.01); *G06Q 30/0275* (2013.01); *G06Q 30/0611* (2013.01);
(Continued)

(58) Field of Classification Search
None
See application file for complete search history.

(56) References Cited

U.S. PATENT DOCUMENTS 5,987,435 A    11/1999 Weiss et al.
6,108,639 A    8/2000 Walker et al.
(Continued)

FOREIGN PATENT DOCUMENTS

CA    2469794    11/2017
WO    WO 00/70520    11/2000
(Continued)

OTHER PUBLICATIONS

U.S. Appl. No. 10/281,166, filed Oct. 2002, Heaton et al.
(Continued)

*Primary Examiner* — Joseph W. King

(57) ABSTRACT

Systems and methods for improving the liquidity and distribution network for luxury and other illiquid items are provided. These systems and methods preferably include the trading of futures and options contracts, which will provide the liquidity and distribution network for luxury items. Possible embodiments of these systems and methods include the trading of futures and options contracts for diamonds and wine. Another embodiment of this invention preferably includes generating indexes for diamond prices, wine prices, luxury item prices, housing values, mortgage prepayments, privately-held companies or for anything with from sufficiently liquid points of value. Another embodiment of this invention preferably includes a centralized data base for retrieving closing and current auction prices for determining the value of, and best method for the auctioning of various items. The data provided by this data base would improve liquidity by creating greater price transparency.

9 Claims, 10 Drawing Sheets

Related U.S. Application Data continuation of application No. 12/703,364, filed on Feb. 10, 2010, now Pat. No. 8,417,620, which is a continuation of application No. 10/281,166, filed on Oct. 28, 2002, now Pat. No. 7,685,050.

(60) Provisional application No. 60/340,328, filed on Dec. 13, 2001.

(51) Int. Cl.

| | |
|---|---|
| *G06Q 40/04* | (2012.01) |
| *G06Q 40/06* | (2012.01) |
| *G06Q 30/08* | (2012.01) |
| *G06Q 40/00* | (2012.01) |
| *G06Q 50/16* | (2012.01) |

(52) U.S. Cl.
CPC ............ *G06Q 30/08* (2013.01); *G06Q 40/00* (2013.01); *G06Q 40/04* (2013.01); *G06Q 40/06* (2013.01); *G06Q 50/16* (2013.01)

(56) References Cited

U.S. PATENT DOCUMENTS

| | | | |
|---|---|---|---|
| 6,202,051 | B1 | 3/2001 | Woolston |
| 6,415,270 | B1 | 7/2002 | Rackson et al. |
| 6,513,020 | B1 | 1/2003 | Weiss et al. |
| 6,556,992 | B1 | 4/2003 | Barney |
| 6,944,599 | B1 | 9/2005 | Vogel et al. |
| 7,047,208 | B1 | 5/2006 | Nelson et al. |
| 7,146,334 | B2 | 12/2006 | Hogg et al. |
| 7,225,153 | B2 | 5/2007 | Lange |
| 7,289,967 | B1 | 10/2007 | Brader-Araje et al. |
| 7,536,338 | B2 | 5/2009 | Guler et al. |
| 7,610,242 | B2 | 10/2009 | Heaton et al. |
| 7,685,050 | B2 | 3/2010 | Heaton et al. |
| 7,729,949 | B2 | 6/2010 | Heaton et al. |
| 2001/0032029 | A1* | 10/2001 | Kauffman ............ G06Q 10/06 700/99 |
| 2001/0034694 | A1 | 10/2001 | Elias |
| 2002/0069155 | A1 | 6/2002 | Nafeh et al. |
| 2002/0082903 | A1 | 6/2002 | Yasuzawa |
| 2003/0110111 | A1 | 6/2003 | Nalebuff |
| 2003/0110122 | A1 | 6/2003 | Nalebuff |
| 2003/0115131 | A1 | 6/2003 | Heaton et al. |
| 2003/0126062 | A1 | 7/2003 | Gilbert |
| 2004/0267657 | A1 | 12/2004 | Hecht |
| 2005/0071265 | A1 | 3/2005 | Nishimaki |
| 2005/0075961 | A1 | 4/2005 | McGill |
| 2005/0080705 | A1 | 4/2005 | Chaganti |
| 2005/0137954 | A1 | 6/2005 | Alldredge |
| 2005/0216384 | A1 | 9/2005 | Partlow |
| 2005/0289036 | A1 | 12/2005 | LaCombe |
| 2006/0100950 | A1 | 5/2006 | Hecht |
| 2006/0271388 | A1 | 11/2006 | Lecomte |
| 2007/0061228 | A1 | 3/2007 | Hecht |
| 2007/0130038 | A1 | 6/2007 | Heaton et al. |
| 2007/0130055 | A1 | 6/2007 | Heaton et al. |
| 2007/0130056 | A1 | 6/2007 | Heaton et al. |
| 2007/0130057 | A1 | 6/2007 | Heaton et al. |
| 2010/0042531 | A1 | 2/2010 | Heaton et al. |
| 2010/0174659 | A1 | 7/2010 | Heaton et al. |
| 2010/0198748 | A1 | 8/2010 | Heaton et al. |
| 2010/0235227 | A1 | 9/2010 | Heaton et al. |
| 2018/0315064 | A1 | 11/2018 | Heaton et al. |

FOREIGN PATENT DOCUMENTS

| | | | |
|---|---|---|---|
| WO | WO 01/82107 | A1 | 1/2001 |
| WO | WO 01/37539 | A1 | 5/2001 |
| WO | WO01/46893 | * | 6/2001 ............ G06F 17/60 |
| WO | WO 01/54036 | A1 | 7/2001 |
| WO | WO 01/57771 | A1 | 8/2001 |

OTHER PUBLICATIONS

U.S. Appl. No. 11/671,029, filed Feb. 2007, Heaton et al.
U.S. Appl. No. 11/671,030, filed Feb. 2007, Heaton et al.
U.S. Appl. No. 11/671,031, filed Feb. 2007, Heaton et al.
U.S. Appl. No. 11/671,032, filed Feb. 2007, Heaton et al.
U.S. Appl. No. 12/604,960, filed Oct. 2009, Heaton et al.
U.S. Appl. No. 12/703,364, filed Feb. 2010, Heaton et al.
U.S. Appl. No. 12/759,777, filed Apr. 2010, Heaton et al.
U.S. Appl. No. 12/787,845, filed May 2010, Heaton et al.
U.S. Appl. No. 60/340,328, filed Dec. 2001, Lutnick.
"Exchanges Look for a Way Into Real Estate," Investment Dealers' Digest, Jul. 11, 1994, p. 6.
Neil Dunse, et al., "Classifying Office Submarkets," Journal of Property Investment & Finance, UK 2001.
"Rental Activities May Constitute Active Trade of Business for REIT," Corporate Taxation, 2001.
Noam Scheiber, "The Pork Bellies Approach to Housing," NY Times Magazine, Fall 2006.
Jon Stock, "Who Says It's a Mug's Game," The Daily Telegraph, London, Jul. 5, 2003.
Kanak Patel, "Lessons from the FOX Residential Property Futures and Mortgage Interest Market," Housing Policy Debate, vol. 5, Issue 3, 1994.
Karl Case et al 1995, "Mortgage Default Risk and Real Estate Prices, The Use of Index-Based Futures and Options in Real Estate," Apr. 1995.
Karl Case et al. 1993, "Index-Based Futures and Options Markets in Real Estate," Journal of Portfolio Management, 1983.
"CME Client Management Advisory Notice," CME Client Management Advisory Notice, Sep. 8, 2003.
"CME Credit Index Event Contract," CME Credit Index Event Contract, Jun. 13, 2007.
"CME Span User Updates," CME Span User Updates, 1998.
"SRC Insights," SRC Insights, vol. 3, Issue 4, 1999.
Robert Hunter, "Swaps-Clearing Mania," Swaps-Clearing Mania, Dec. 1998.
OFHEO, House Price Index, web pages extracted from Archive.org, Date: Jan. 25, 1999, Updated. Jun. 6, 2000.
Ian Ayres and Barry Nalebuff, "Why Not? Price Protect Your Home," http://www.forbes.com/2002/08/28/0829whynot.html, Aug. 29, 2002.
Clive Wolman, "Futures Contract to Allow Betting on House Prices," Financial Times (London), Sep. 17, 1988, Section I, UK News, p. 4.
Woods, Pritchard, "Place Your Bets on House Prices; Personal Finance," The Sunday Times (London), Sep. 18, 1988, p. D14.
"Companies: Property—Property Futures: Housing Hedge," Financial Times Business: Investors. Chronical, Feb. 15, 1991, p. 49.
Clare Stewart, "Take a Fresh Look at Property," The Times (London), May 11, 2002, Features.
"Housing Prices," The Dealing Handbook, IG Index, Version 3. 5, Sep. 2002, pp. 1, 79-82.
Angus McCrone, "Best Bets for Riding House Prices Wave," The Evening Standard (London), Nov. 13, 2002, p. 38.
"Property Futures," Cityindex, http://www.cityindex.com.uk/spreadbetting/Finance_SpecialMarkets.cfm?property=1, printed Jan. 29, 2003, 5 pp.
"Wine Futures: Buying 'En-Primeurs'," CellarsDirect.com, http://cellarsdirect.com/futures.htm, printed Feb. 10, 2003, 2 pp.
Printouts of web-pages from HBOSplc website relating to Halifax House Price Index, http://www.hbpsplc.com.
Kelkoo, "Compare Prices Before You Buy Using Our Online Shopping Service," at http://web.archive.org/web/20010516222619/ukr5.kelkoo.com, May 22, 2001, verified using http://www.archive.org, printed Oct. 12, 2005.
Case, Karl E. Jr., Shiller, Robert J. Weiss, Allan N., "Index-Based Futures and Options Markets in Real Estate," Journal of Portfolio Management, New York, Winter 1993, vol. 19, Issue 2, p. 83.
Russell Shor, "Comex 'Very Serious' About Diamond Futures," (New York Commodities Exchange), Jeweler's Circular-Keystone, Apr. 1988.

(56) References Cited

OTHER PUBLICATIONS

"World of Minerals: United Kingdom: Diamond of Futures," Industrial Minerals, Nov. 1985, p. 15.
"West Coast Commodity Exchange Hold First Diamond Trading Futures," NY Times, Jan. 20, 1972.
Thomas W. Ennis, "Sugar Futures Up on Soviet Buying" The New York Times, Jan. 5, 1972.
Hilip Pullela, "Vintage Futures Drinkers Feeling Pain Despite Scarcity," South China Morning Post, Mar. 8, 1998, p. 10.
International Search Report for PCT Application No. PCT/US02/39234, dated Nov. 19, 2003, 3 pp.
Canadian Examination Report for Application No. 2,469,794 dated Mar. 21, 2012 (4 pages).
Canadian Examination Report for Application No. 2,469,794 dated Mar. 22, 2016 (6 pages).
Canadian Examination Report for Application No. 2,469,794 dated Apr. 12, 2017 (1 page).
Canadian Examination Report for Application No. 2982084; dated Aug. 1, 2018 (4 pages).

\* cited by examiner

| Symbol | Open | Hi/Low | Last | Settle | Change | Open Int |
|---|---|---|---|---|---|---|
| CBNV | 15.05 | 17/14 | 15.00 | 15.00 | 0.00 | 89 |
| CBSV | 13.37 | 15/12 | 13.00 | 13.00 | 0.00 | 60 |
| CBFR | 16.67 | 17/10 | 16.00 | 16.00 | 0.00 | 40 |
| CBGOL | 19.97 | 25/10 | 19.00 | 19.00 | 0.00 | 20 |
| 710 | 720 | 730 | 740 | 750 | 760 | 770 |

FIG. 7

Jan-05 810
Calls
| Symbol | Last Trade | Chg | Bid | Ask | Vol | Open Int. |
|---|---|---|---|---|---|---|
| CBNAP | 2.30 | 0.00 | 2.15 | 2.30 | 0 | 4,738 |
| 801 | 802 | 803 | 804 | 805 | 806 | 807 |

Strike Price
10
808

820
Puts
| Symbol | Last Trade | Chg | Bid | Ask | Vol | Open Int |
|---|---|---|---|---|---|---|
| CABNIP | 0.15 | 0.00 | 0.10 | 0.25 | 0 | 5,624 |
| 801 | 802 | 803 | 804 | 805 | 806 | 807 |

FIG. 8

SYSTEMS AND METHODS FOR IMPROVING THE LIQUIDITY AND DISTRIBUTION NETWORK FOR LUXURY AND OTHER ILLIQUID ITEMS

CROSS REFERENCE TO RELATED APPLICATION

This application is a continuation of U.S. patent application Ser. No. 13/613,662 filed on Sep. 13, 2012 which is a continuation of U.S. patent application Ser. No. 12/703,364 filed Feb. 10, 2010 (now U.S. Pat. No. 8,417,620 issued on Apr. 9, 2013), which is a continuation of U.S. patent application Ser. No. 10/281,166 filed Oct. 28, 2002 now U.S. Pat. No. 7,685,050 issued on Mar. 23, 2010), which claims the benefit of U.S. Provisional Application No. 60/340,328 filed on Dec. 13, 2001, the disclosures of which are incorporated herein by reference in their entireties.

BACKGROUND OF THE INVENTION

Markets for luxury items such as diamonds and fine wine tend to be illiquid at least in part because of the difficulty in acquiring luxury items and the difficulty of bringing the luxury items to market. The present invention relates to systems and methods for improving the liquidity and distribution network for luxury items.

It would be desirable to provide systems and methods that provide the liquidity and distribution network for luxury items.

SUMMARY OF THE INVENTION

It is an object of this invention to provide systems and methods that provide the liquidity and distribution network for luxury items.

In a system and method according to the invention, a user would be able to purchase or sell futures or options contracts for luxury items using a computer-based futures and options exchange system. The system may preferably list a number of futures or options contracts of a particular luxury item based on user-inputted criteria. Based on this information, the user could either select an existing contract or, alternatively, create a new contract around the desired criteria. The user may then view the contract status and execute a trade.

Further systems and methods according to the invention, provide a computer based system for electronically collecting market information to aid in the settlement of futures or options contracts. For a particular item for which a futures or options contract is offered, relevant market data from various sources could be captured, compiled, sorted, and updated by the computer system to generate an index for that particular item. This index could then be used to help settle futures and options contracts.

Alternatively, liquidity and distribution of various illiquid items can be improved through the creation of a centralized data base and system for retrieving closing and current auction prices for determining the value of, and best method for auctioning: goods, services, real assets and securities. The systems and methods according to the invention provide a centralized computer data base(s) for storing relevant data on the auction item or auction object. The centralized data base is connected to various on-line auctions agents. In this way auction data on an item, preferably updated in real-time or at least updated at some pre-determined interval, can be accessible to all who need the information for valuation and determining the best auction method.

BRIEF DESCRIPTION OF DRAWINGS

Further features of the invention, its nature and various advantages will be apparent from the following detailed description of the preferred embodiments, taken in conjunction with the accompanying drawings, in which like reference characters refer to like parts throughout, and in which:

FIG. 7 is an illustration of a chart of data for wine futures contracts in accordance with some embodiments of the present invention; and FIG. 8 is an illustration of a chart of data for wine options contracts in accordance with some embodiments of the present invention.

DETAILED DESCRIPTION OF THE INVENTION

This invention relates to creating systems and methods for providing futures and options contracts for luxury items—i.e., items that add to pleasure or comfort but are not absolutely necessary to survival of humans or animals. The following embodiment of the invention relates to diamonds. Nevertheless, this embodiment does not limit the invention to this particular subject matter. Rather, it is provided for illustration of the invention and not to limit it to a particular commodity or market.

Typically, diamonds are classified according to four main characteristics to determine the value of a diamond: clarity, color, cut, and carat weight (one carat 0.007 of an ounce).

Color of a diamond may include blue-white, finest white, fine white, white, commercial white, top silver cape, silver cape, light cape, cape, dark cape, finest light brown, fine light brown, light brown, and dark brown. Commercial color scales may be based on letters of the alphabet with AA being on one end of the spectrum, to D, which covers the previous list from blue-white to silver cape. Most common of color scales is the scale that ranges alphabetically from D to Z which corresponds to a scale of colorless to lightly colored. The value of the diamonds generally decrease as the presence of color increases.

The cut of a diamond also determines the value of the diamond. Certain cuts, such as brilliant, emerald, pear-shaped and marquise, are the most common. Yet, even among these common cuts, the different geometries of each particular stone affect the value of the diamond. Particularly desirable geometries are well-known in the industry. Highly light-reflective geometries are generally regarded as the most valuable because they provide the most luster, fire and brilliance as seen by a viewer.

The value of diamonds also depend on the clarity of the diamond—i.e., the presence, or absence, of carbon inclusions in a diamond. For the purposes of this application, clarity of a diamond is defined as In the most commonly-used scale, the clarity ranges are represented as a range from flawless to VVS1 to VS to SI to I. This represents a range from flawless to very slightly included to slightly included to included. Value varies proportionally with the clarity of the diamond—i.e., the more clear the diamond, the more valuable.

Presently, at least in part because of their scarcity, the market for high quality diamonds is very tightly controlled. One purpose of the systems and methods of the present invention is to provide for greater liquidity in the diamond market.

Figure 1:
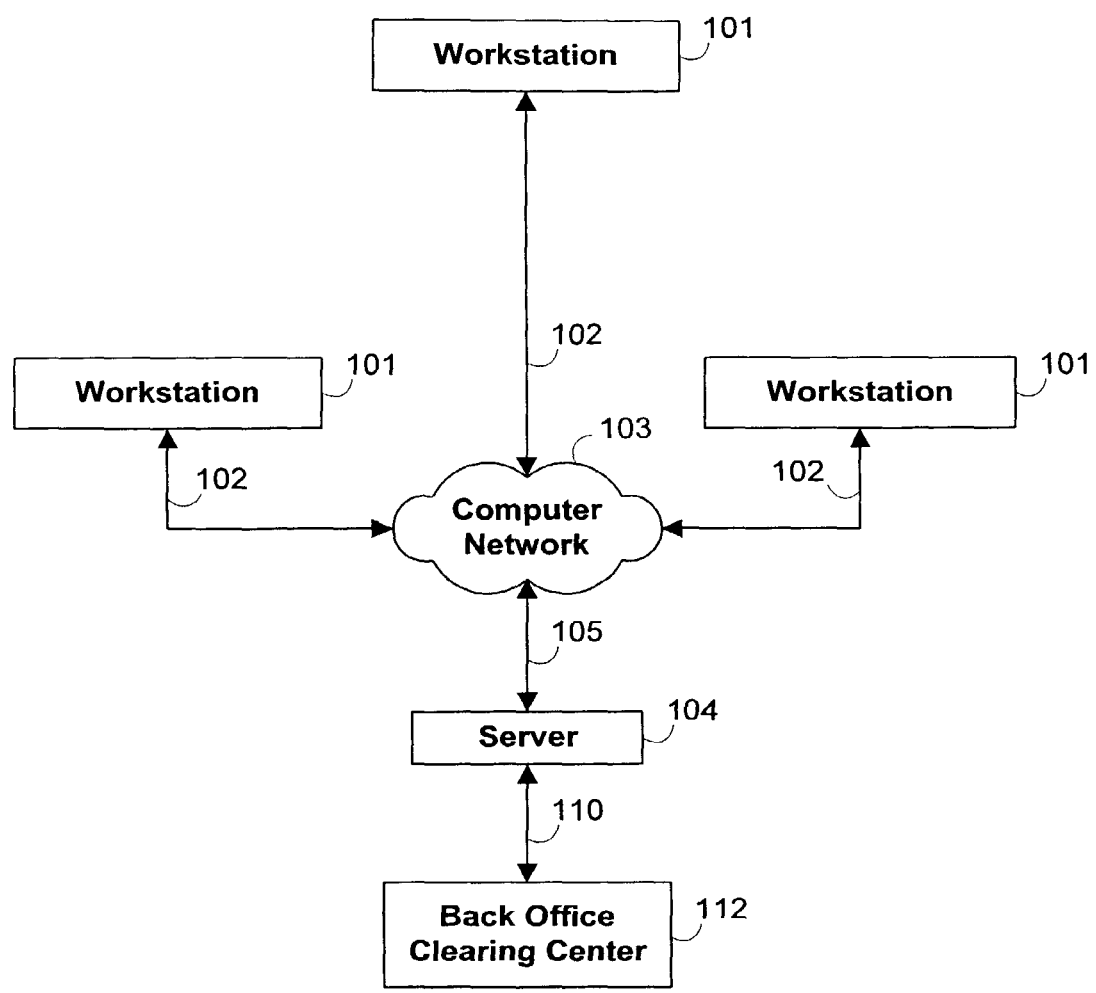
FIG. 1 is an illustration of an electronic implementation of a system to sell futures and options contracts for luxury item in accordance with some embodiments of the present invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 may be used to process and settle executed trades of futures and/or options contracts for luxury items.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with the trades that relate to the present invention, and display trade, benchmark, or spread information to users of system 100.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, etc.

Figure 2:
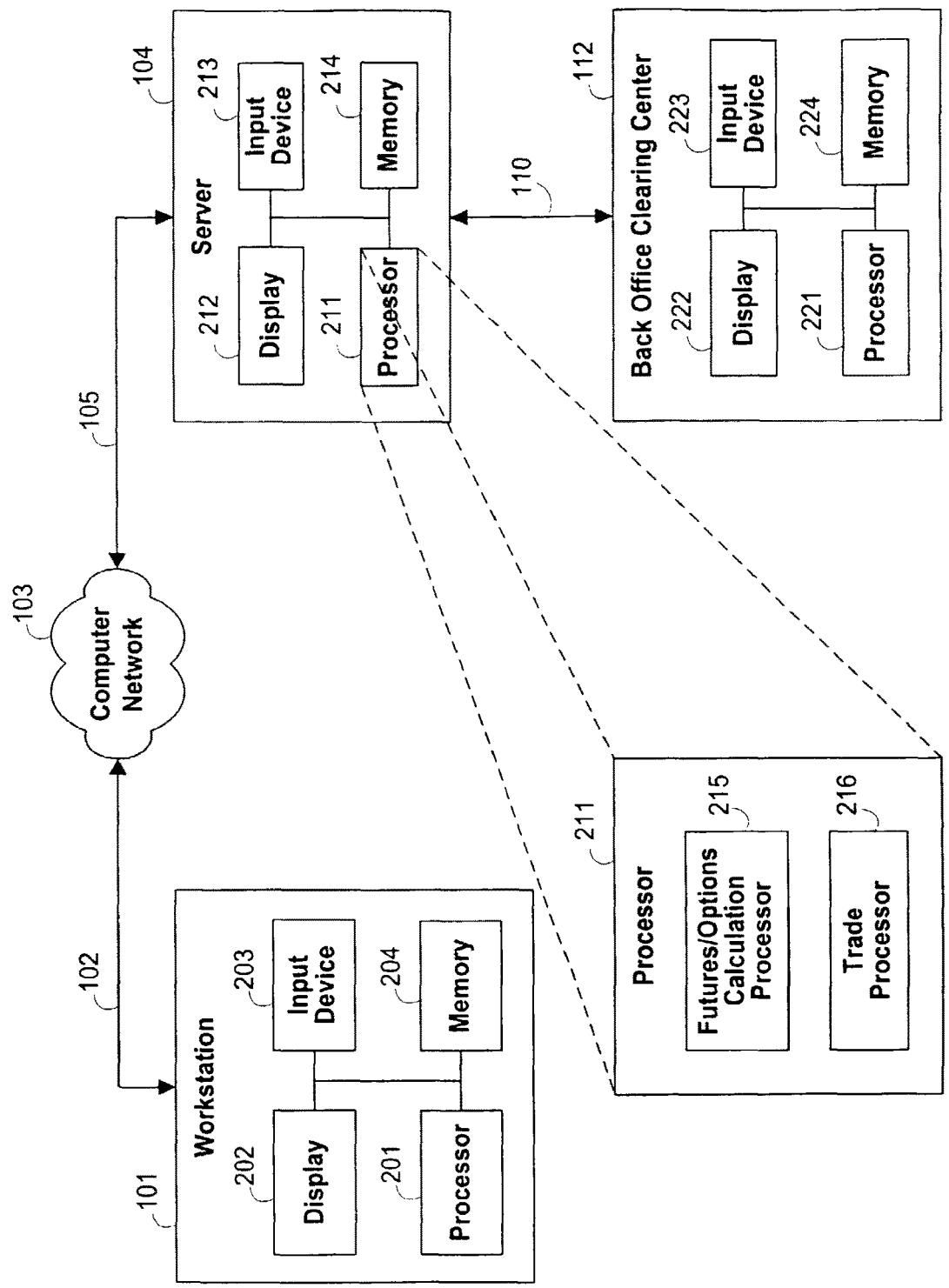
FIG. 2 is an illustration, in greater detail, of an electronic implementation of a system to sell futures and options contracts for luxury items in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 may use the workstation program to present on display 202 trade information relating to bids, offers, executed trades, and luxury item information to a user of workstation 101. Furthermore, input device 203 may be used by the user to enter such bids and offers, modify them, and to enter into trades involving the futures and/or options contracts for luxury items.

Server 104 may include processor 211, display 212, input device 213, and memory 214, which may be interconnected. In a preferred embodiment, memory 214 contains a storage device for storing trade information relating to the trades. The storage device further contains a server program for controlling processor 211. Processor 211 uses the server program to transact the purchase and sale of the futures and/or options contracts. Processor 211 may include futures and/or options calculation processor 215 that may be implemented to determine the benchmark values based on market conditions or other criteria that may relate to the items. Processor 211 may include trade processor 216 that executes and processes trades.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to clear executed trades. Clearing executed trades may preferably include exchanging currency for a future commitment or a future option.

A standard diamond profile, according to the invention, based on certain pre-determined characteristics, may be used to standardize the diamond such that the diamond may be bought and sold in a futures and/or options contract market. A standard diamond profile for future delivery may include the following: a brilliant one carat weight, having a VVS2 clarity, and a G color, the proportions of the depth may be between 60% and 62%, the table may be between 60% and 62%, the girdle may be medium to thick without a culet and the polish and symmetry may be graded as good or higher by the Gemological Institute of America, located in Carlsbad, Calif. (the "GIA"). This particular diamond, or a number of such diamonds, may be deliverable at any pre-determined date in the future, but more particularly at one month, two months, three months, four months etc. into the future. A computer based system preferably similar to, or integrated with server 104 will create the standard profile and then post futures or options contracts based on that profile.

Figure 3:
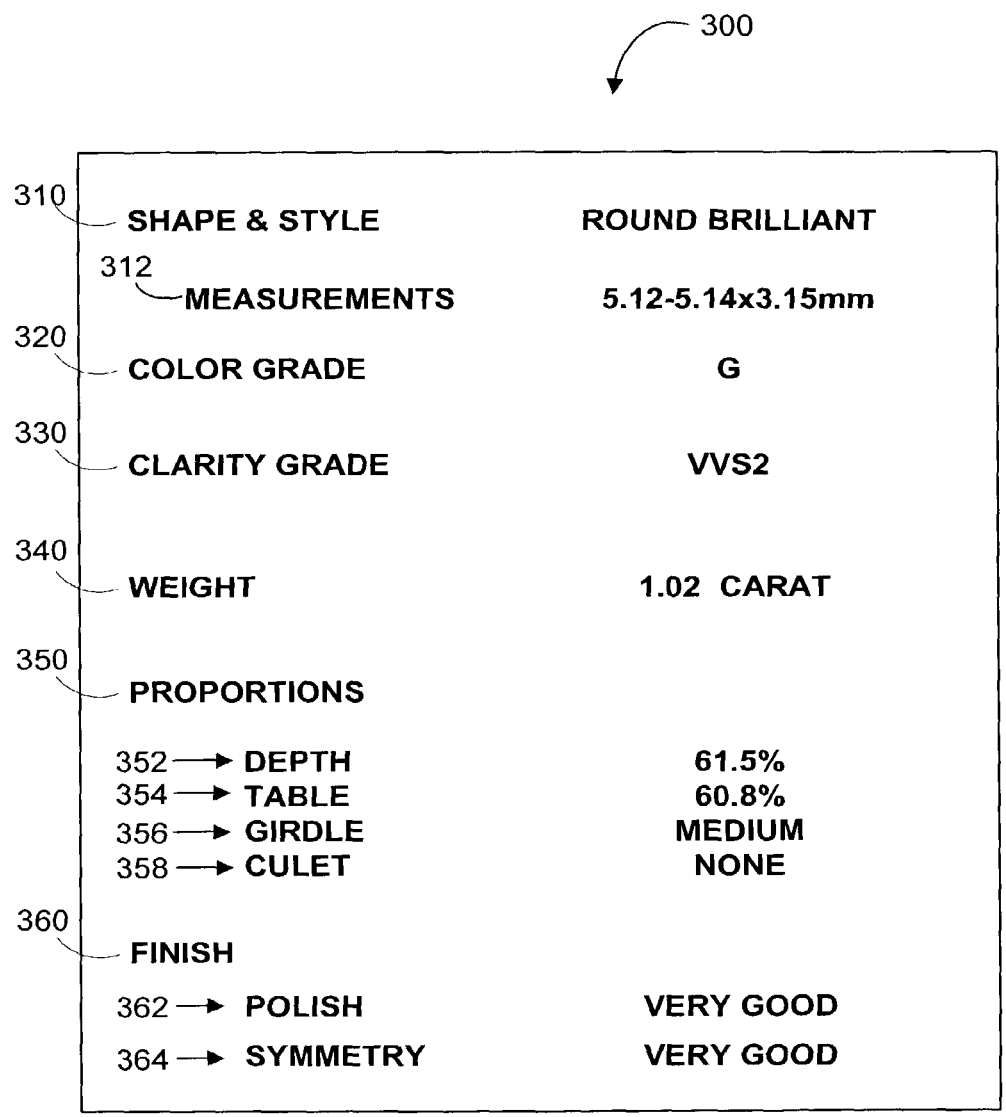
FIG. 3 is an illustration of a typical grading report for a diamond in accordance with some embodiments of the present invention.

FIG. 3 shows a typical grading report 300 for a diamond. Grading report 300 may typically include shape 310, color grade 320, clarity grade 330, weight 340, proportions 350 (including depth 352, table 354, girdle 356, and culet 358), and finish 360 (including polish 362 and symmetry 364.) As described above a pre-determined diamond profile can be standardized for future delivery to obtain a base value, or, alternatively, a benchmark, for a diamond futures and/or options contract. Such grading reports are offered, for example, by the GIA and include relevant information for forming a profile of a diamond. A copy of a detailed grading report—e.g., a GIA certificate—may be included with the delivery of the diamond at the termination of the contract.

Figure 4:
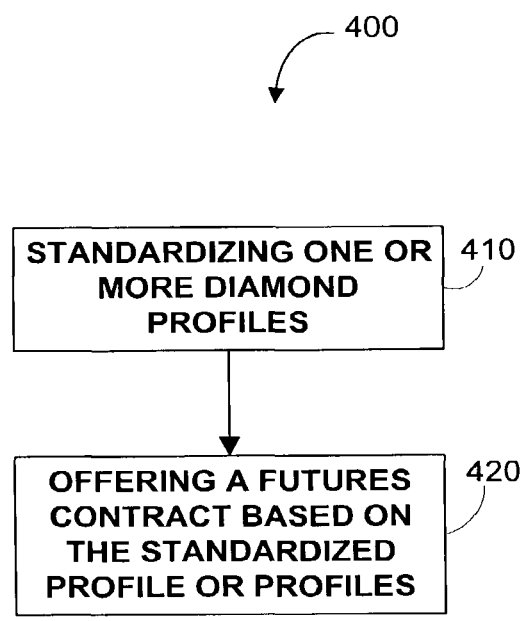
FIG. 4 is an illustration of a flow chart representing the process of offering a futures contract for one or more diamonds based on one or more standardized profiles in accordance with some embodiments of the present invention.

FIG. 4 shows a method 400 according to the invention. The method shows standardizing a diamond profile at step 410. The method also shows offering a futures and/or options contract based on the standard diamond profile at step 420. In an alternative embodiment of the invention, a number of different diamond profiles may be standardized.

Figure 5:
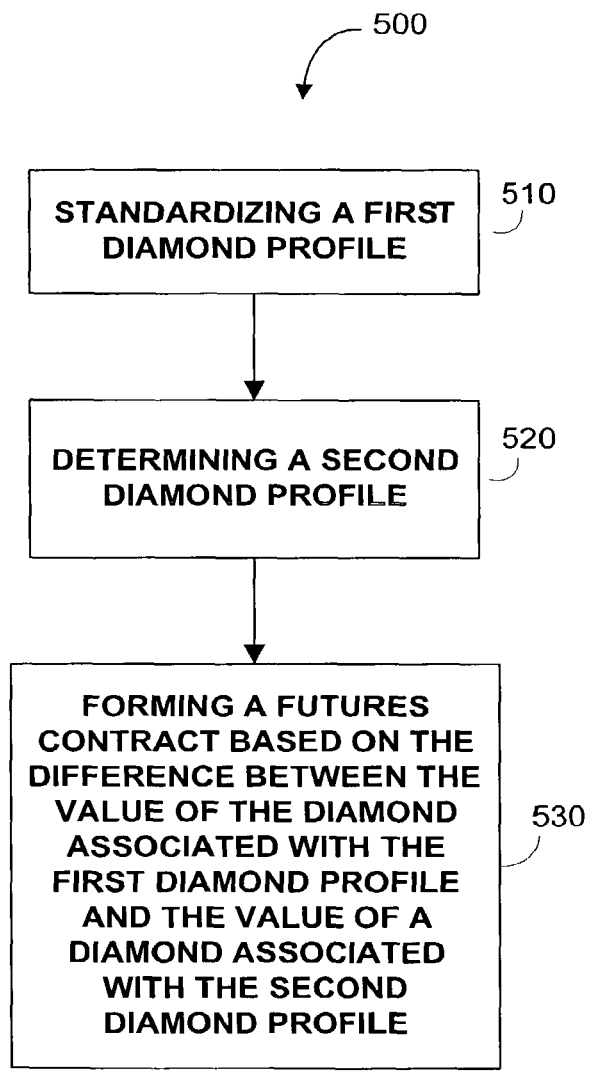
FIG. 5 is an illustration of a flow diagram representing the process of forming a futures contract for a diamond based on the difference between the values of two different profiles in accordance with some embodiments of the present invention.

FIG. 5 shows a method 500 of forming a security based on the spread between one particular deliverable—i.e., a diamond at a first diamond profile—and a second particular deliverable—i.e., a diamond at a second diamond profile. The method includes standardizing a first diamond profile 510, determining a second diamond profile 520, and forming a futures and/or options contract based on the difference between the value of the standard diamond associated with the first diamond profile and the value of an actual diamond associated with the second diamond profile 530. In this fashion, the difference in value—i.e., the spread—between the first diamond and the second diamond may be traded as well. With this spread, either the first, standardized or benchmark, diamond value or the second diamond value may be used as the bench mark for this other value or for a plurality of values.

Standardization of diamond contracts allows future positions to be liquidated easily—e.g., through an exchange or a clearinghouse—rather than by negotiating with the other party to the contract. Thus, a futures and/or options contract preferably adds much-needed liquidity to a particularly illiquid market. This is because the exchange binds each party to perform the contract. Guaranteed performance of each party preferably eliminates the need for costly credit checks on other traders. Thus transaction costs are substantially reduced by requiring only a good faith deposit to insure good credit of the traders.

Another example of a system and method according to the invention relates to futures and/or options contracts for wine. The scarcity and delicate quality of wine tends to reduce the liquidity of the wine market. According to the invention, however, it is possible to increase the liquidity of the market by standardizing a wine profile to create a benchmark and for trading futures and/or options contracts for the wine based on the standard wine profile.

Wine can also be classified and selected based on its own unique set of criteria: type, geographic region, winery, vintage, and price range.

A specific wine or a group of wines may be selected based upon some or all of these five criteria. The wine type can be very broad such as simply red or white. Type can also refer to the specific designation of the wine—e.g., Cabernet Sauvignon, Merlot, Chardonnay or Riesling. Designation of a specific geographic region, winery, vintage and price range can also be used to select a particular wine or group or wines. The specificity with which these criteria are designated will determine the breadth of wine selection—i.e., a person with very specific needs may request a 2001 Napa Valley Chardonnay whereas another person may simply need a red wine that costs around $10.

Figure 6:
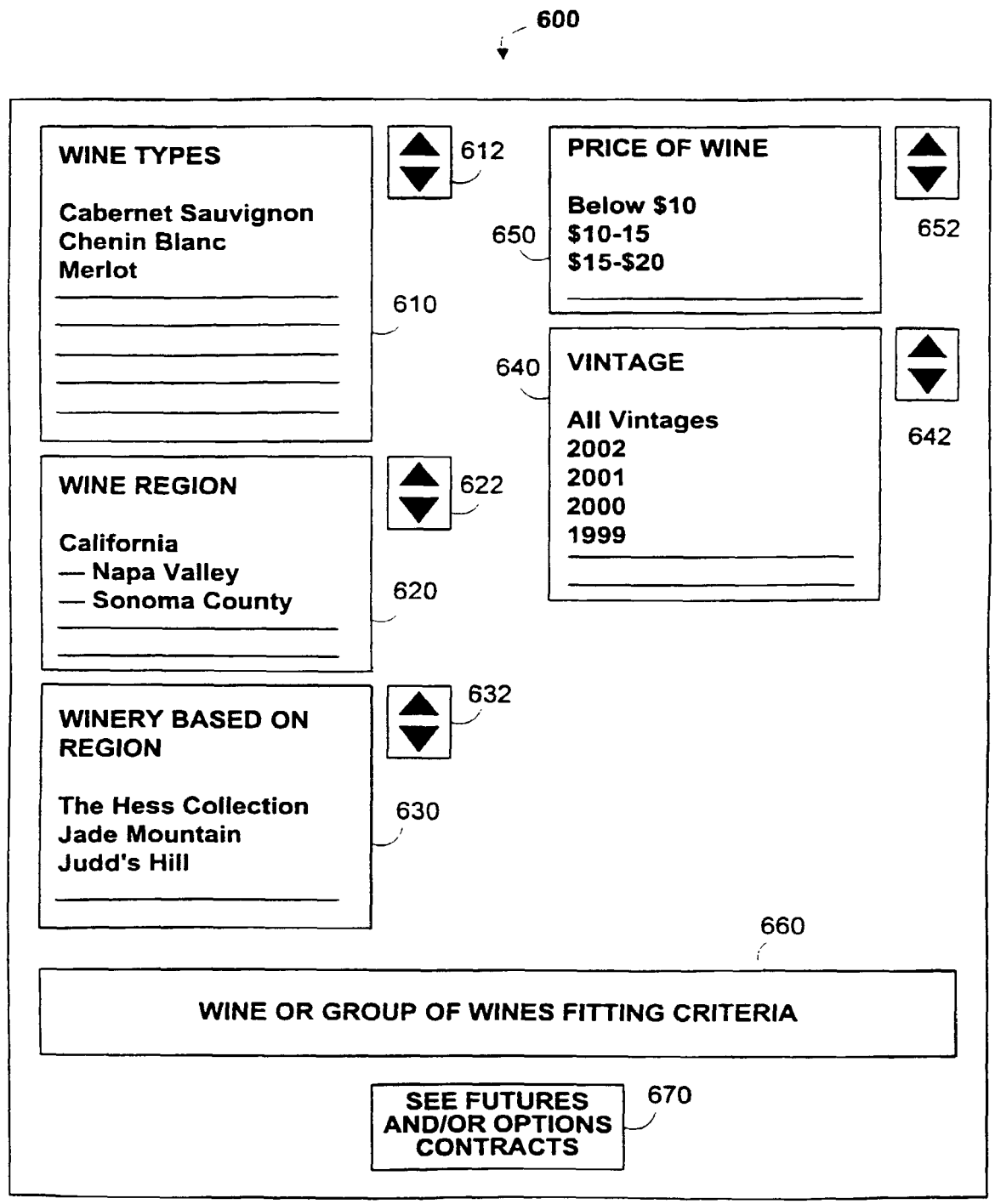
FIG. 6 is an illustration of an interface for selecting wine that may be presented in accordance with some embodiments of the present invention.

FIG. 6 shows a graphical user interface 600 according to the invention that may be used to select a futures and/or options contract relating to a future transaction for wine. Interactive screen section 610 shows an area in which the user may select the type of wine. Interactive screen section 620 shows an area in which the user may select a particular geographic location of the vineyard. Interactive screen section 630 shows an area in which the user may select a particular winery that produced the wine. Interactive screen section 640 shows an area in which the user may select a particular vintage, or year of production, of the wine. Finally, interactive screen section 650 shows a price, or range of prices, of the wine.

Once a user has selected his preferred criteria of wine, area then section 660 preferably shows a single wine or group of wines that fit into the selected user criteria. Once a group of wines appears in area 660, the user may preferably click on the wine to transfer to futures and/or options screens as shown in FIGS. 7 and 8, and described in more detail below. Alternatively once a desired wine is highlighted, the user may click on the "See futures and/or options contracts" button 670 to obtain futures and options information. It should be noted that this particular interface may be used for any luxury item as an interface to efficiently obtain a desired contract the he wishes to participate in.

FIG. 7 shows an example of a futures screen for the trading of wine futures contracts. After selecting a particular futures contract or group of futures contracts, this screen displays relevant market information. The information on the screen may typically include the symbol of the pertinent futures contract 710, the opening price for the futures contract 720, the highest and lowest value the futures contract traded at within a specified period 730, the price of the last futures contract traded 740, the settlement price 750—i.e., the current price of the futures contract, the last change in price 760, and the open interest 770—i.e., the total number of futures contracts traded that have not yet been liquidated.

FIG. 8 shows an example of an options screen for the trading of wine. After selecting a particular option, this screen displays relevant market information. The information on the screen may typically include information on a Calls 810, which are options to buy futures contracts, as well as Puts 820, which are options to sell futures contracts. For each of these transactions, the screen will contain relevant market data for each item represented by its particular symbol 801. The market data may include such information as the amount paid for the last option 802, the last change in price 803, the highest price being currently offered to buy the option 804, the lowest price for which the option is being sold 805, the volume of shares traded 806, the open interest 807—i.e., the total number of options contracts traded that have not yet been liquidated, and the strike price—i.e., the stated price per share for which the future may be purchased (in the case of a call) or sold (in the case of a put) by the option holder upon exercise of the option contract.

In the case where there is not an existing futures or options contract based on the selected criteria, the user may create a new futures or options contract. This will allow the trading of any available diamond, wine, or luxury item.

Due to the existing illiquid nature of the markets for luxury items, it may be useful for the methods and systems of the present invention to electronically collect market information to aid in the settlement of luxury item contracts. This information can be organized in the form of a luxury item index—a statistical composite that measures changes in that specific financial market. In order to create a luxury item index, the system may electronically capture—e.g., retrieve and preserve in a lasting form—compile—e.g., arrange or compose from materials gathered from several sources—sort—e.g., classify according to a suitable classification system according to class, kind, size, or other suitable criteria—and update relevant data preferably in real time or other suitable pre-determined interval. The result of these systems and methods would be to provide an index for any type of luxury item, group of luxury items, or in fact, any type of less liquid, but exchanged commodity or item. This index could then be used to help settle options or futures contracts or even in certain circumstances, cash contracts as well.

Examples of this method may include providing an index for diamond prices. This diamond index may be based on available price lists for diamonds—i.e. the Rapaport Sheets—and other similar industry price lists which may be electronically obtainable.

Advantages of systems and methods according to the invention include allowing a diamond merchant or wine merchant to limit the risk on his future purchase or sale of the respective products. Thus, if diamond retailer A wanted to insure his supply of diamonds for the upcoming holiday season, he may contract to purchase X amount of diamonds in December at a specific price. Though retailer A may pay a premium for the right to buy the diamond in December at a particular price, he is protected from supply problems or other vagaries of the marketplace that may occur between the time when he entered into the contract and the settlement date in December. This is one example of risk-sharing advantages obtained by systems and methods according to the invention.

Alternatively, systems and methods according to the invention may provide speculators an opportunity to invest in items and markets that, in the past, were not liquid enough to allow for investment by the general public. Systems and methods for creating indexes for these items or markets can help improve their overall liquidity.

An example of such a market that supports such an index may be housing values. An index may be created for housing values in a particular area—Inputs to such a housing index may be real estate price surveys, mortgage applications, or some other suitable input that may be obtained electronically and used for input into an index processor. In such a system and method according to the invention, the index further may be divided according to regions or may be user-configurable such that the user may create his own index for use according to a user specified region, preferably assuming that the region was sufficiently large to create a usable index. Users could specify a large geographic region—e.g., the Northeast Region of the U.S., or they could specify a particular city—e.g., New York City, or they could specify a particular area within the city—e.g., SOHO or they could specify a particular zip-code or other suitable regional limitation. The system and methods according to the invention would then generate a housing values index for that specified region.

One use for this system and method according to the invention is to enable the trading of futures and options contracts based on this housing values index. The ability to trade futures and options based on this index would allow banks to reduce their exposure to risk from their mortgage portfolios.

Another example of a market that supports such an index may be mortgage prepayments—This information may be obtained from banking institutions.

Another example of a market that supports such an index may be based on privately-held companies. Such an index may use the publicly-available EBIDTA (Earnings Before Interest Depreciation and Taxes) as the provider of the data.

One underlying theme of these systems and methods according to the invention is that an index may be created from any sufficiently liquid points of value.

Another aspect of the invention involves Internet or intranet auctions. In recent years, on-line auction sites have grown as a place for individuals to buy and sell items. Due to the transient nature of the individualized transactions on these sites, it can be difficult to determine the proper valuation or auction method for a particular auction item without painstakingly reviewing the transaction history of many other similar auction items. For example, changes in the number of similar items being auctioned at a given site at a given time may drastically affect the final price or, with respect to used items, small differences in condition may drastically affect the price paid for the auction item. The auction method used, such as the choice of auction type, e.g., standard auction, reserve price auction, private auction, Dutch auction, or auction length or opening bid, may also affect the price paid for the auction item. The particular Internet auction site used might also affect the final price paid for an auction item. By tracking auctions of particular items over a longer period of time and over many different auction sites, buyers and sellers can make better decisions with regard to pricing as well as the best method for conducting the auction.

In this embodiment of the invention, liquidity and distribution of auction items can be improved through systems and methods that track transactions of Internet auction sites. By tracking Internet auctions sites for pending and completed auctions the systems and methods of this invention can provide information which is useful for determining valuation or best auction method for a particular auction item. The tracking of Internet auction sites can be performed by, searching the Internet auction sites, capturing, compiling, extracting a possibly user-specified portion of the data, performing possibly user-specified calculations with this extracted data, and updating the data and the results.

Furthermore, these systems and methods of the invention relate to a data processing methodology and system for a universal, uniform system for tracking auction data by searching, capturing, compiling, extracting, calculating, and updating. These systems and methods could be used for auction items such as: diamonds, wine, motor vehicles, boats, antiques, artwork, real property, and securities or any suitable auctioned items. More precisely, it relates to a computerized system containing a server similar to 104 by which all current systems are converted in a uniform manner to a unique but universal system, by creating and then centralizing, that single system as the single source of the system so that data may be searched, captured, compiled, sorted, extracted, arranged in such a manner to allow calculations to performed on the data, calculated and updated from a variety of sources and accurate, from which up-to-date values may be established preferably in real-time, though it may also be establish at any suitable pre-determined interval. This system may be preferably accessed through a plurality of workstations similar to workstation 101. Through these workstations, a user may access the server to view the tracked auction data and may also configure the searching, capturing, compiling, sorting, extracting, calculating, and updating the data.

Records for Internet auctioned items are currently maintained by various unrelated parties because auctions generally occur at disparate locations on the Internet. Therefore, Internet auctioned items are not conducive to price transparency. Furthermore, there is no current universal system or means for searching and then universally centralizing all records to ensure that all information is up to date, accurate and accessible to various unrelated parties.

Through systems and methods according to the invention, users will be able to view auction statistics and other relevant information calculated from auction data. Preferably, by specifying criteria for a particular item or items and specifying the type of information desired, a user will be presented with relevant statistical data which will be helpful for participating in an Internet auction. The statistical data for each auction in progress and completed auction, may preferably contain information relevant to the successful bids, the unsuccessful bids, the final price, the method of auction, as well as validation of the auction data.

Figure 9:
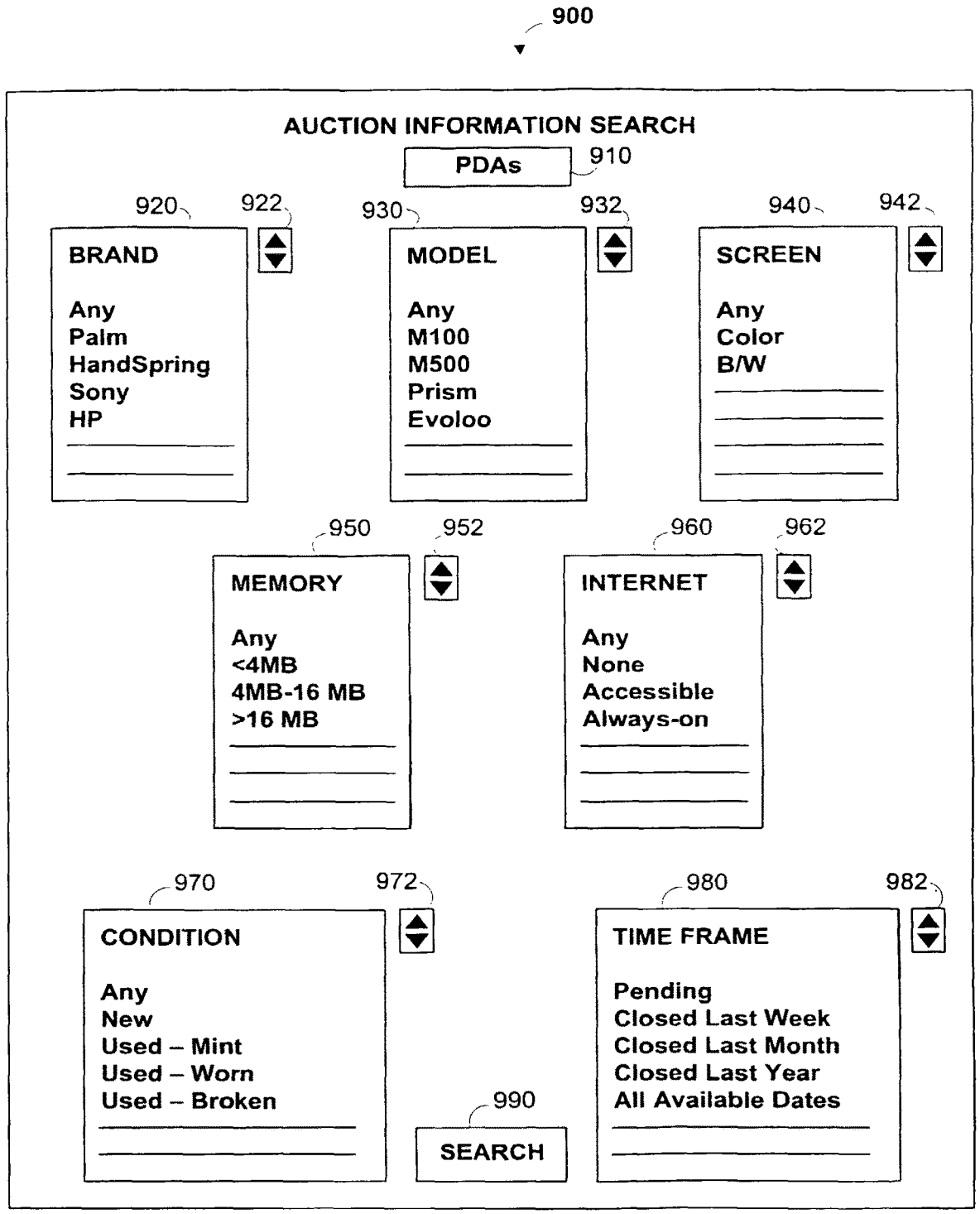
FIG. 9 is an illustration of an interface for searching the data base of auction information based on user inputted criteria in accordance with some of the embodiments of the present invention.

FIG. 9 shows a graphical user interface 900 according to the invention that may be used to perform a search of auction data based upon user criteria. In this case, the user has already selected PDAs as the category 910 for the search. For each category of items selected, the search interface 900 contains search options to define the scope of the search. The number and specific type of options available will depend on the category selected. For PDAs, there are seven search options. Interactive screen section 920 shows an area in which a user may select the brand. Interactive screen section 930 shows an area in which a user may select the model. Interactive screen section 940 shows an area in which a user may select the screen type. Interactive screen section 950 shows an area in which a user may select the amount of memory. Interactive screen section 960 shows an area in which a user may select the internet connectivity. Interactive screen section 970 shows an area in which a user may select the condition of the PDA being auctioned—i.e., new or used. Further gradations (e.g.—condition 1-10) may also be used. Interactive screen section 980 shows an area in which a user may select the time frame to be searched—i.e., currently pending auctions only or all auctions that occurred over a specified period. After the user specifies the criteria desired for the search, the user may select the Search button 990 to perform the search.

Figure 10:
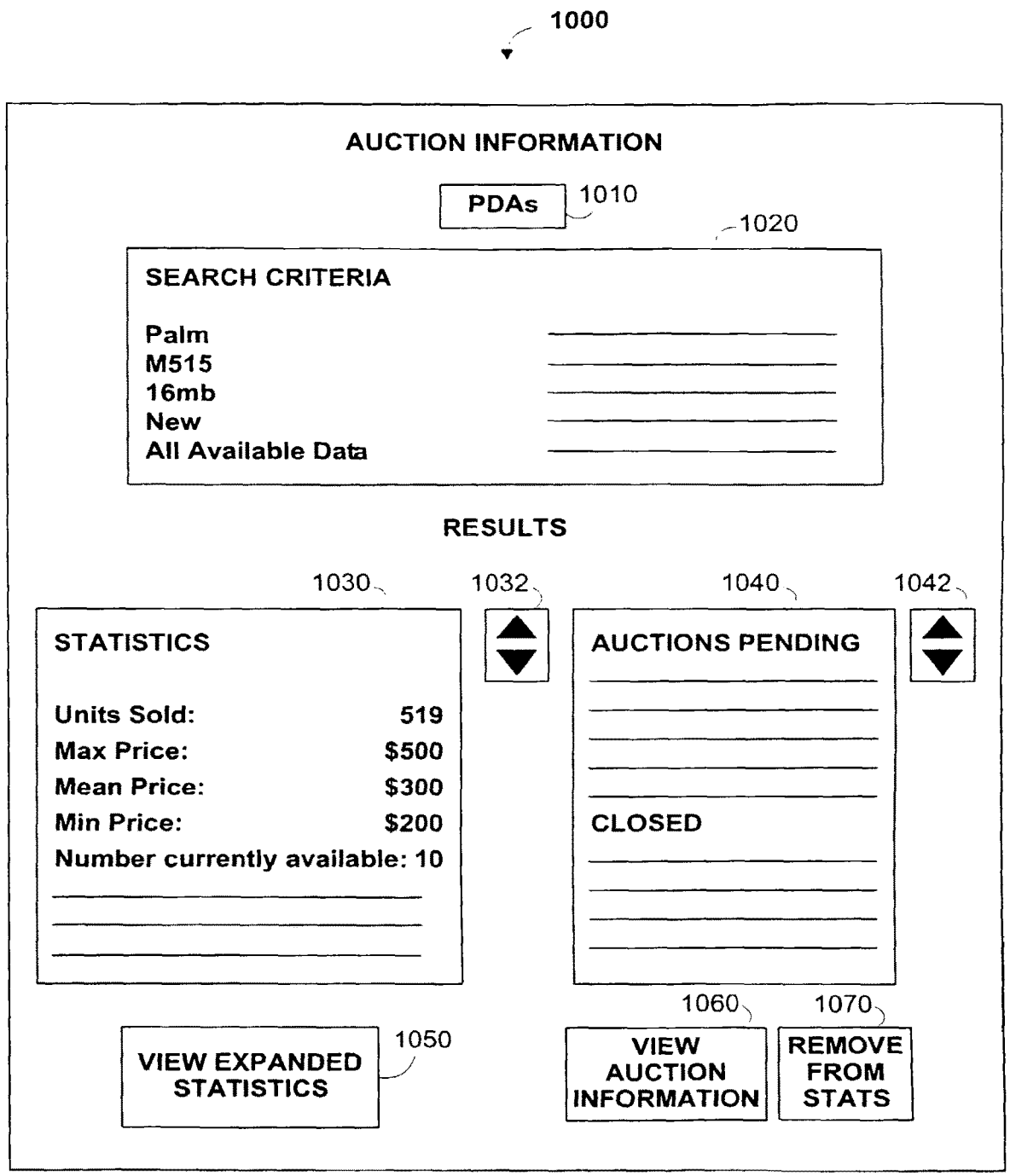
FIG. 10 is an illustration of an interface for displaying the results of a search of the data base of auction information based on user inputted criteria in accordance with some of the embodiments of the present invention.

FIG. 10 shows a graphical user interface 1000 according to the invention that may be used to display the results of the auction data search. Screen section 1010 shows the category searched. Screen section 1020 shows the search criteria selected by the user. Interactive screen section 1030 shows selected statistics calculated from the search. One or more statistics, such as average price, high price, low price, auction duration, units sold, and unit available, may be selected and the user may click on "View Expanded Statistics" 1050 to display more detailed information, which may include charts or graphs, for each statistical item. Interactive screen section 1040 preferably shows the auctions that match the users selected criteria. The screen section may differentiate between the pending and completed auctions. The user may select one or more auctions and click "View Auction Information" 1060, to view the specific information about the auction(s) selected including verification data. The user may also select one or more auctions and click "Remove From Stats" 1070, to remove auction(s) from being calculated in the statistics.

Accordingly, systems and methods for providing liquidity and distribution networks for luxury and other items are provided. It will be understood that the foregoing is merely illustrative of the principles of the invention and that various modifications can be made by those skilled in the art without departing from the scope and spirit of the invention, with is limited only by the claims that follow.

What is claimed is:
1. A method comprising:
creating, by a computer system, a standard luxury item profile defining a set of characteristics of a standard luxury item;
displaying, by the computer system over a communication network, in a graphical user interface of a first remote computing device, a plurality of interactive screen sections corresponding to respective characteristics of the set of characteristics of the standard luxury item profile;
receiving, by the computer system over the communication network, from the first remote computing device, a plurality of first values corresponding to the respective characteristics of the set of characteristics, based on interactions by a first user of the first remote computing device with the plurality of interactive screen sections;
displaying, by the computer system over the communication network, in a filtered interactive screen section of the graphical user interface, one or more luxury items meeting criteria established by the plurality of first values;
receiving, by the computer system over the communication network, from the first remote computing device, a selected one of the displayed one or more luxury items from the filtered interactive screen section, based on interaction by the first user of the first remote computing device with the graphical user interface;
receiving, by the computer system over the communication network from the first remote computing device, a first order to trade at least one of a first futures or a first option contract for the selected one of the luxury items from the first user, wherein the at least one of the first futures or the first option contract specifies the selected one of the luxury items according to the plurality of first values;
receiving, by the computer system over the communication network from a second remote computing device, a second order to trade at least one of a second futures or a second option contract for at least one second luxury item from a second user, wherein the at least one of the second futures or the second option contract specifies that the at least one second luxury item has a plurality of respective second values for each characteristic of the set of characteristics defined by the standard luxury item profile, in which the second values are different from the first values;
communicating, over the communication network from the computer system, the first and second orders to at least one other user of a third remote computing device;
in real time, by the computer system:
    receiving, over the communication network from at least one fourth remote computing device, real time market data,
    continuously updating an index for the one or more luxury items generated from and responsive to the receiving of the real time market data,
    displaying, over the communication network, in a screen of the graphical user interface, the real time market data associated with the selected one of the displayed one or more luxury items, and
    executing a trade in at least one of the first futures contract, the first option contract, the second futures contract, or the second option contract, in accordance with the index; and
delivering at least one of the selected one of the displayed one or more luxury items and the at least one second luxury item at at least one future date to satisfy the at least one of the first futures contract, the first options contract, the second futures contract, or the second options contract.

2. The method of claim 1, wherein the selected one of the displayed one or more luxury items comprises at least one diamond.

3. The method of claim 1, wherein the selected one of the displayed one or more luxury items comprises at least one wine.

4. A system comprising a processor and memory that stores a program that when executed enables the processor to perform a method comprising:
   creating, by the processor, a standard luxury item profile defining a set of characteristics of a standard luxury item;
   displaying, by the processor over a communication network, in a graphical user interface of a first remote computing device, a plurality of interactive screen sections corresponding to respective characteristics of the set of characteristics of the standard luxury item profile;
   receiving, by the processor over the communication network, from the first remote computing device, a plurality of first values corresponding to the respective characteristics of the set of characteristics, based on interactions by a first user of the first remote computing device with the plurality of interactive screen sections;
   displaying, by the processor over the communication network, in a filtered interactive screen section of the graphical user interface, one or more luxury items meeting criteria established by the plurality of first values;
   receiving, by the processor over the communication network, from the first remote computing device, a selected one of the displayed one or more luxury items from the filtered interactive screen section, based on interaction by the first user of the first remote computing device with the graphical user interface;
   receiving, by the processor over the communication network from the first remote computing device, a first order to trade at least one of a first futures or a first option contract for the selected one of the luxury items from the first user, wherein the at least one of the first futures or the first option contract specifies the selected one of the luxury items according to the plurality of first values;
   receiving, by the processor over the communication network from a second remote computing device, a second order to trade at least one of a second futures or a second option contract for at least one second luxury item from a second user, wherein the at least one of the second futures or the second option contract specifies that the at least one second luxury item has a plurality of respective second values for each characteristic of the set of characteristics defined by the standard luxury item profile, in which the second values are different from the first values;
   communicating, over the communication network from the processor, the first and second orders to at least one other user of a third remote computing device; and
   in real time, by the processor:
      receiving, over the communication network from at least one fourth remote computing device, real time market data,
      continuously updating an index for the one or more luxury items generated from and responsive to the receiving of the real time market data,
      displaying, over the communication network, in a screen of the graphical user interface, the real time market data associated with the selected one of the displayed one or more luxury items, and
      executing a trade in at least one of the first futures contract, the first option contract, the second futures contract, or the second option contract, in accordance with the index.

5. The system of claim 4, wherein the selected one of the displayed one or more luxury items comprises at least one diamond.

6. The system of claim 4, wherein the selected one of the displayed one or more luxury items comprises at least one wine.

7. The system of claim 4, wherein the selected one of the displayed one or more luxury items comprises at least one wine.

8. A non-transitory storage medium configured to store instructions which, when executed by at least one processor, controls:
   creating, by the processor, a standard luxury item profile defining a set of characteristics of a standard luxury item;
   displaying, by the processor over a communication network, in a graphical user interface of a first remote computing device, a plurality of interactive screen sections corresponding to respective characteristics of the set of characteristics of the standard luxury item profile;
   receiving, by the processor over the communication network, from the first remote computing device, a plurality of first values corresponding to the respective characteristics of the set of characteristics, based on interactions by a first user of the first remote computing device with the plurality of interactive screen sections;
   displaying, by the processor over the communication network, in a filtered interactive screen section of the graphical user interface, one or more luxury items meeting criteria established by the plurality of first values;
   receiving, by the processor over the communication network, from the first remote computing device, a selected one of the displayed one or more luxury items from the filtered interactive screen section, based on interaction by the first user of the first remote computing device with the graphical user interface;
   receiving, by the processor over the communication network from the first remote computing device, a first order to trade at least one of a first futures or a first option contract for the selected one of the luxury items from the first user, wherein the at least one of the first futures and the first option contract specifies the selected one of the luxury items according to the plurality of first values;
   receiving, by the processor over the communication network from a second remote computing device, a second order to trade at least one of a second futures or a second option contract for at least one second luxury item from a second user, wherein the at least one of the second futures or the second option contract specifies that the at least one second luxury item has a plurality of respective second values for each characteristic of the set of characteristics defined by the standard luxury item profile, in which the second values are different from the first values;

communicating, over the communication network from the processor, the first and second orders to at least one other user of a third remote computing device; and in real time, by the processor:
- receiving, over the communication network from at least one fourth remote computing device, real time market data,
- continuously updating an index for the one or more luxury items generated from and responsive to the receiving of the real time market data,
- displaying, over the communication network, in a screen of the graphical user interface, the real time market data associated with the selected one of the displayed one or more luxury items, and
- executing a trade in at least one of the first futures contract, the first option contract, the second futures contract, or the second option contract, in accordance with the index.

9. The non-transitory storage medium of claim 8, wherein the selected one of the displayed one or more luxury items comprises at least one diamond.

\* \* \* \* \*